(12) United States Patent
Olivieri (10) Patent No.: US 11,938,695 B2
(45) Date of Patent: Mar. 26, 2024

(54) DE-TAPING MACHINE AND METHOD FOR REMOVING A TAPE OF A LENS-MOLD-ASSEMBLY

(71) Applicant: Essilor International, Charenton-le-Pont (FR)

(72) Inventor: François Olivieri, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 270 days.

(21) Appl. No.: 17/239,422

(22) Filed: Apr. 23, 2021

(65) Prior Publication Data
US 2021/0339489 A1    Nov. 4, 2021

(30) Foreign Application Priority Data

Apr. 30, 2020   (EP) ..................................... 20305415

(51) Int. Cl.
*B29D 11/00* (2006.01)
*B29C 39/22* (2006.01)
*B29L 11/00* (2006.01)

(52) U.S. Cl.
CPC ........ *B29D 11/00432* (2013.01); *B29C 39/22* (2013.01); *B29D 11/00413* (2013.01); *B29L 2011/0016* (2013.01)

(58) Field of Classification Search
CPC ........ B29D 11/00432; B29D 11/00413; B29L 2011/0016; B29C 39/22
See application file for complete search history.

(56) References Cited

U.S. PATENT DOCUMENTS

| 4,326,325 A | * | 4/1982 | Chambers | ............... B29C 43/02 |
| | | | | 82/47 |
| 4,518,551 A | * | 5/1985 | Lin | ......................... B29C 37/02 |
| | | | | 264/296 |

FOREIGN PATENT DOCUMENTS

| CN | 108081524 | 5/2018 |
| CN | 108372616 | 8/2018 |
| CN | 208133436 | 11/2018 |

(Continued)

OTHER PUBLICATIONS

Extended EP Search Report for EP 20305415.0 dated Oct. 16, 2020, 9 pages.

*Primary Examiner* — Linda L Gray
(74) *Attorney, Agent, or Firm* — NIXON & VANDERHYE (57) ABSTRACT

A de-taping machine for removing a tape around a lens-mold-assembly. The machine including a lens-mold-assembly-rotation mechanism for holding and rotating the lens-mold-assembly and a tape gripping mechanism. The tape gripping mechanism including a first jaw having a clamping surface; a second jaw movable towards the first jaw for clamping a free end of the tape; a proximity sensing arrangement to generate a first detection signal when the free end of the tape is at a pre-determined distance from the first jaw; and a contact sensing arrangement to generate a second detection signal when the tape is in contact with the first jaw. A rotational speed of the lens-mold-assembly-rotation may be varied based on the first detection signal. Further, the lens-mold-assembly-rotation mechanism may be stop and the tape gripping mechanism may move the second jaw for clamping based on the second detection signal. A corresponding method for tape removal.

20 Claims, 5 Drawing Sheets

(56) References Cited

FOREIGN PATENT DOCUMENTS

EP 0295458 A1 * 12/1988 ............. B20C 37/02
KR 10-2014-0023727 2/2014

* cited by examiner

DE-TAPING MACHINE AND METHOD FOR REMOVING A TAPE OF A LENS-MOLD-ASSEMBLY

CROSS-REFERENCE TO RELATED APPLICATIONS

This application claims priority to EP 20305415.0 filed Apr. 30, 2020, the entire content of which is hereby incorporated by reference.

FIELD

Various embodiments generally relate to a de-taping machine for removing a tape of a lens-mold-assembly. In particular, various embodiments generally relate to a de-taping machine for removing a tape around a perimeter of a lens-mold-assembly. Various embodiments also relate to a method of removing a tape of a lens-mold-assembly. In particular, various embodiments generally relate to a method of removing a tape around a perimeter of a lens-mold-assembly.

BACKGROUND

Conventional method for lens manufacturing is typically via a manual process. Typically, liquid molding materials are manually filled into a cavity between two molding shells with a tape holding the two molding shells together along the perimeter thereof so as to form a molded lens therebetween. Subsequently, the tape is manually removed and the two molding shells are manually separated from the molded lens to retrieve the molded lens. The manual tape removal process usually involves manually grasping the tape tail between two fingers and pulling the tape with a large arm move around the molding shells and molded lens assembly. This tape removal process is time consuming and not ergonomic. Further, the operator is required to look for the tape tail manually with his/her eyes. Accordingly, the main problem in such manual process is a problem of efficiency. For example, the manual process limits production yield, is dependent on operator's skill and productivity is affected by human fatigue.

Accordingly, there is a need to provide a more efficient solution with high accuracy to address at least some of the issues in the lens manufacturing process.

SUMMARY

According to various embodiments, there is provided a de-taping machine for removing a tape around a perimeter of a lens-mold-assembly. The machine may include a lens-mold-assembly-rotation mechanism having a first rotary part and a second rotary part coaxially aligned, the first rotary part and the second rotary part being operable to be axially spaced from each other along a common axis for holding the lens-mold-assembly therebetween, each of the first rotary part and the second rotary part being rotatable about the common axis. The machine may include a tape gripping mechanism. The tape gripping mechanism may include a first jaw disposed at a radial position from the common axis, the first jaw having a clamping surface. The tape gripping mechanism may include a second jaw movable towards the first jaw to perform a clamping action for clamping a free end of the tape around the perimeter of the lens-mold-assembly aligned to the tape gripping mechanism. The tape gripping mechanism may include a proximity sensing arrangement disposed on the first jaw and configured to generate a first detection signal when the free end of the tape is detected at a pre-determined distance from the first jaw. The tape gripping mechanism may include a contact sensing arrangement disposed on the clamping surface of the first jaw and configured to generate a second detection signal when the free end of the tape is in contact with the clamping surface of the first jaw. According to various embodiments, the lens-mold-assembly-rotation mechanism may be configured to vary a rotational speed of the first rotary part and the second rotary part based on the first detection signal from the proximity sensing arrangement. According to various embodiments, the lens-mold-assembly-rotation mechanism may be configured to stop the first rotary part and the second rotary part from rotating and the tape gripping mechanism may be configured to move the second jaw towards the first jaw to perform the clamping action based on the second detection signal from the contact sensing arrangement.

According to various embodiments, there is provided a method of removing a tape around a perimeter of a lens-mold-assembly. The method may include rotating the lens-mold-assembly held between coaxially aligned first and second rotary parts of a lens-mold-assembly-rotation mechanism of a de-taping machine, wherein the first and second rotary parts are axially spaced from each other along a common axis for holding the lens-mold-assembly therebetween, and wherein the first and second rotary parts are rotatable about the common axis to rotate the lens-mold-assembly. The method may include varying a rotational speed of the first and second rotary parts based on a first detection signal from the proximity sensing arrangement, wherein the proximity sensing arrangement is disposed on a first jaw of a tape gripping mechanism of the de-taping machine, wherein the lens-mold-assembly is aligned to the tape gripping mechanism, wherein the first jaw of the tape gripping mechanism is disposed at a radial position from the common axis, wherein the proximity sensing arrangement is configured to generate the first detection signal when a free end of the tape around the perimeter of the lens-mold-assembly is detected at a pre-determined distance from the first jaw. The method may include stopping the first and second rotary parts from rotating the lens-mold-assembly and move a second jaw of the tape gripping mechanism of the de-taping machine towards the first jaw to perform a clamping action for clamping the free end of the tape based on a second detection signal from a contact sensing arrangement, wherein the second jaw is movable relative to the first jaw to perform the clamping action, wherein the contact sensing arrangement is disposed on a clamping surface of the first jaw and configured to generate the second detection signal when the free end of the tape is in contact with the clamping surface of the first jaw.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF EMBODIMENTS

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments seek to provide a de-taping machine and a method for removing a tape around a perimeter of a lens-mold-assembly. The lens-mold-assembly may include a tri-layer intermediate structure having two molding shells with a molded lens therebetween, and a tape surrounding the perimeter of the tri-layer structure. Various embodiments seek to provide a repeatable, quick and accurate solution for removing the tape around the perimeter of the lens-mold-assembly such that the tri-layer intermediate structure may be subsequently disassembled for retrieving the molded lens. Various embodiments may minimize or eliminate the dependency on operator's skill and productivity. Various embodiments may perform tape removal for a lens-mold-assembly in a fully automated manner whereby the tape tail (or the free-end of the tape) may be automatically detected and automatically grasped and removed. Various embodiments may provide a high accuracy of tape tail detection as well as a reliable and repeatable tape grasping and removal process to allow a sustained continuous operation of tape removal for multiple lens-mold-assemblies one after another so as to ensure a high productivity output.

According to various embodiments, the de-taping machine may include a tape gripping mechanism and a tape peeling mechanism. The tape gripping mechanism may detect and grip the tape tail and the tape peeling mechanism may move the tape gripping mechanism to peel or unroll the tape from the lens-mold-assembly. According to various embodiments, the tape gripping mechanism may include a fixed jaw and a movable jaw, whereby the fixed jaw may be used as a support for tape tail detection while the movable jaw may be used to grasp the tape tail. According to various embodiments, detection of the tape tail may be via a combination of a proximity sensing arrangement (e.g. optical detection) and a contact sensing arrangement (e.g. vacuum detection). According to various embodiments, the detection system may include the proximity sensing arrangement to roughly detect the position of the tape tail and the contact sensing arrangement to precisely detect the position of the tape tail (for example, a vacuum generator and a vacuum sensor for vacuum detection). According to various embodiments, for an efficient detection and grasping of the tape tail, the lens-mold-assembly may be handled by a rotary system with adjustable rotation speed. According to various embodiments, the grasping and pulling of the tape may be enabled by a gripper with high friction jaws (or jigs) mounted on a translation axis with a stroke longer than the tape length. According to various embodiments, for an efficient tape pulling, the lens-mold-assembly may be handled by the rotary system that may also allow free rotation or controlled rotation of the assemblies during tape pulling.

According to various embodiments, there is provided a de-taping machine with automatic detection and automatic grasping of the tape tail for tape removal. According to various embodiments, the tape removal process may be completed within 12 seconds/lens. Further, the automatic tape tail detection may have an accuracy of at least 99%.

Figure 1:
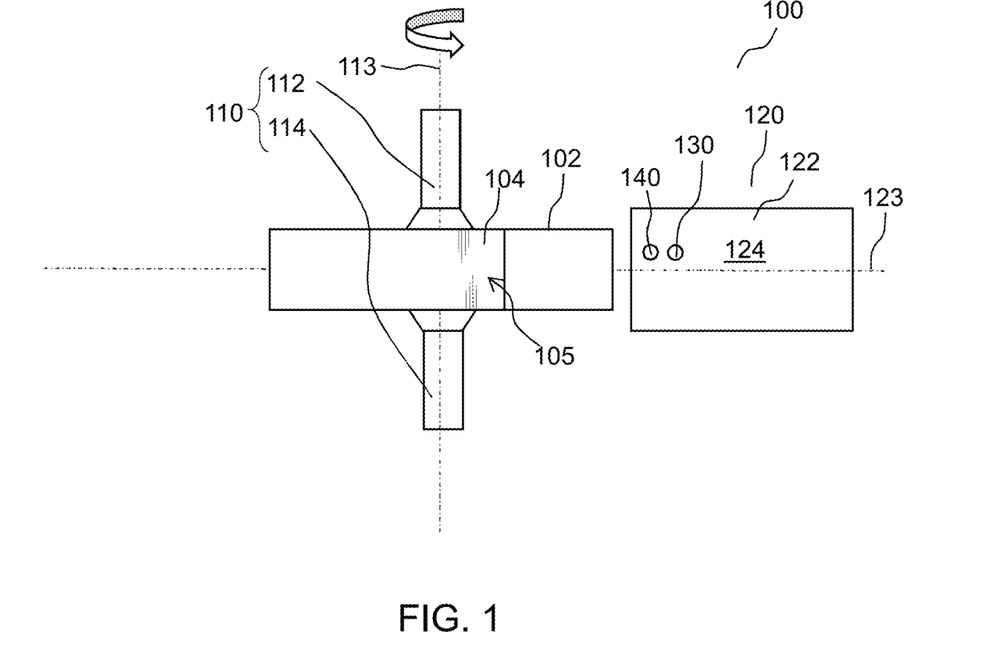
FIG. 1 depicts a schematic side view diagram of a de-taping machine for removing a tape around a perimeter of a lens-mold-assembly according to various embodiments.
Figure 2A:
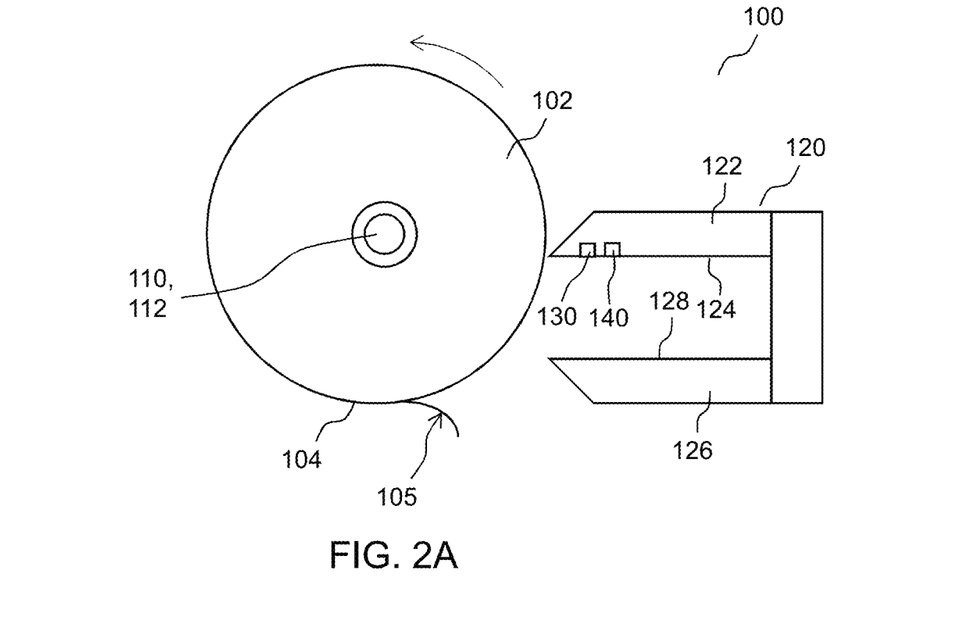
FIG. 2A to FIG. 2E depict schematic diagrams of a method of removing the tape around the perimeter of the lens-mold-assembly with the de-taping machine of FIG. 1 according to various embodiments.

FIG. 1 depicts a schematic side view diagram of a de-taping machine 100 for removing a tape 104 around a perimeter of a lens-mold-assembly 102 according to various embodiments. In FIG. 1, the de-taping machine 100 is shown with only a first jaw 122 of a tape gripping mechanism 120 of the de-taping machine 100 and without the tape peeling mechanism 150 (see FIG. 3) for a clearer illustration of the first jaw 122. FIG. 2A shows a schematic top view diagram of the de-taping machine 100 of FIG. 1 and a starting disposition of the tape removal process. In FIG. 2A, the de-taping machine 100 is shown without the tape peeling mechanism 150 (see FIG. 3) for a clearer illustration of the tape gripping mechanism 120.

According to various embodiments, the lens-mold-assembly 102 may be an intermediate assembly of a lens manufacturing process. The lens-mold-assembly 102 may include a tri-layer intermediate structure 106 (for example, as shown in FIG. 3) having a first mold part 107 (or a first molding shell), a second mold part 109 (or a second molding shell), and a molded lens 108 sandwiched therebetween. The lens-mold-assembly 102 may further include the tape 104 being taped around or wrapped around or surrounding a perimeter (or a periphery side) of the tri-layer intermediate structure 106 (for example, as shown in FIG. 1 and FIG. 2). The tape 104 may have a width that extends across a thickness of the tri-layer intermediate structure 106 so as to cover across the periphery sides of the first mold part 107, the molded lens 108 and the second mold part 109. According to various embodiments, a free-end 105 (or a tape tail or a tape end) of the tape 104 may be sticking out or protruding from the perimeter (or the periphery side) of the tri-layer intermediate structure 106. Accordingly, the free-end 105 of the tape 104 may be an end portion of the tape 104 that is jutting out along the perimeter of the lens-mold-assembly 102. According to various embodiments, the lens-mold-assembly 102 may be in the form of a disc or a plate or a panel having a circular shape.

Referring to FIG. 1, according to various embodiments, the de-taping machine 100 may include a lens-mold-assembly-rotation mechanism 110. The lens-mold-assembly-rotation mechanism 110 may be configured to hold and rotate the lens-mold-assembly 102 about an axis extending perpendicular through the first mold part 107, the molded lens 108 and the second mold part 109. According to various embodiments, the lens-mold-assembly-rotation mechanism 110 may include a first rotary part 112 and a second rotary part 114 coaxially aligned. Accordingly, the first rotary part 112 and the second rotary part 114 may lie on a common axis 113. Each of the first rotary part 112 and the second rotary part 114 may be rotatable about the common axis 113. Accordingly, a rotational axis of the first rotary part 112 and a rotational axis of the second rotary part 114 may coincide with the common axis 113. According to various embodiments, the lens-mold-assembly-rotation mechanism 110 may include at least one rotary actuator coupled to the first rotary part 112 and the second rotary part 114. According to various embodiments, the lens-mold-assembly-rotation mechanism 110 may include a first rotary actuator coupled to the first rotary part 112 and a second rotary actuator coupled to the second rotary part 114.

Further, according to various embodiments, the first rotary part 112 and the second rotary part 114 may be operable to be axially spaced from each other along the common axis for holding the lens-mold-assembly 102 therebetween. Accordingly, the first rotary part 112 and the second rotary part 114 may be separated along the common axis 113 such that there is a space or a gap or a distance between the first rotary part 112 and the second rotary part 114 along the common axis 113, whereby the space or the gap or the distance is sufficient for holding the lens-mold-assembly 102. Hence, the lens-mold-assembly 102 may be fitted or placed or inserted into the space or the gap or the distance between the first rotary part 112 and the second rotary part 114 in a manner such that the lens-mold-assembly 102 may be sandwiched or clamped or held between the first rotary part 112 and the second rotary part 114. According to various embodiments, when the lens-mold-assembly 102 is sandwiched or clamped or held between the first rotary part 112 and the second rotary part 114, the lens-mold-assembly 102 may be rotated by the first rotary part 112 and the second rotary part 114. Accordingly, the lens-mold-assembly 102, the first rotary part 112 and the second rotary part 114 may together function as a single article or unit and may be rotatable together about the common axis 113. Hence, when the lens-mold-assembly 102 is sandwiched or clamped or held between the first rotary part 112 and the second rotary part 114, there may not be any relative rotation about the common axis 113 between each other or they may be non-rotatable relative to each other about the common axis 113.

According to various embodiments, the lens-mold-assembly 102 may be held by the first rotary part 112 and the second rotary part 114 in an orientation perpendicular to the common axis 113. Accordingly, each of the first mold part 107, the molded lens 108 and the second mold part 109 may be perpendicular to the common axis 113 such that the common axis 113 extends perpendicularly through the trilayer intermediate structure 106 of the lens-mold-assembly 102. Hence, the lens-mold-assembly 102 may be held with a thickness direction of the lens-mold-assembly 102 being parallel to the common axis 113. Thus, in this orientation, the tape 104 of the lens-mold-assembly 102 may be rotated about the common axis 113.

According to various embodiments, the de-taping machine 100 may include the tape gripping mechanism 120 (for example, see FIG. 2A). According to various embodiments, the tape gripping mechanism 120 may be aligned with the space or the gap or the distance between the first rotary part 112 and the second rotary part 114 along the common axis 113. Accordingly, the tape gripping mechanism 120 may be disposed in a lateral plane 123 (or a horizontal plane) which is perpendicular to the common axis 113 and which intersect the common axis 113 at the space or the gap or the distance between the first rotary part 112 and the second rotary part 114 along the common axis 113. Hence, the lens-mold-assembly 102 held between the first rotary part 112 and the second rotary part 114 may be aligned to the tape gripping mechanism 120 such that the tape gripping mechanism 120 may be operable to grip the free-end 105 of the tape 104 that is sticking out along the perimeter of the lens-mold-assembly 102.

According to various embodiments, the tape gripping mechanism 120 may include the first jaw 122 (for example, see FIG. 1 and FIG. 2A) disposed at a radial position from the common axis 113. The first jaw 122 may lie in the lateral plane 123 and may be positioned at a predetermined distance in a radial direction (or radiating) from the common axis 113. According to various embodiments, the first jaw 122 at the radial position may be stationary with respect to the common axis 113. According to various embodiments, the predetermined distance in the radial direction may be based on a radius of the lens-mold-assembly 102 or a length of a straight line extending from a center of the lens-mold-assembly 102 to the perimeter of the lens-mold-assembly 102. According to various embodiments, the predetermined distance in the radial direction may be equal to the radius of the lens-mold-assembly 102 plus an offset distance. According to various embodiments, the offset distance may be between 0.1 mm to 10 mm.

According to various embodiments, the first jaw 122 may include a clamping surface 124. According to various embodiments, the clamping surface 124 and the lateral plane 123 may be intersecting planes. Accordingly, the clamping surface 124 may intersect the lateral plane 123 at an angle. According to various embodiments, the clamping surface 124 may intersect the lateral plane 123 at right angle such that the clamping surface 124 may be perpendicular to the lateral plane 123. According to various embodiments, the clamping surface 124 may be aligned with the common axis 113 radially such that a line of intersection between the clamping surface 124 and the lateral plane 123 may be directed towards the common axis 113. Accordingly, a vector direction of the line of intersection between the clamping surface 124 and the lateral plane 123 directed towards the common axis 113 may perpendicularly intersect the common axis 113. According to various other embodiments, the clamping surface 124 may not be aligned with the common axis 113 radially, but rather, the common axis 113 and a line of intersection between the clamping surface 124 and the lateral plane 123 may be a pair of skew lines such that a vector direction of the line of intersection between the clamping surface 124 and the lateral plane 123 directed towards the common axis 113 may not intersect and are not parallel to the common axis 113.

According to various embodiments, the tape gripping mechanism 120 may include a second jaw 126 (for example see FIG. 2A) movable towards the first jaw 122 to perform a clamping action. According to various embodiments, the first jaw 122 and the second jaw 126 may form a clamping mechanism whereby the first jaw 122 and the second jaw 126 may be two opposing jaws. Further, the second jaw 126 may be operable to be moved towards the first jaw 122 so as to close onto the first jaw 122 for cooperating with the first jaw 122 to perform the function of clamping. In an example, the clamping force between the first jaw 122 and the second jaw 126 may be between 10 to 300 N. According to various embodiments, the second jaw 126 may be movable along the lateral plane 123 in a direction towards the first jaw 122 so as to be movable to close onto the first jaw 122 for clamping. According to various embodiments, a movement path of the second jaw 126 may be perpendicular towards the clamping surface 124 of the first jaw 122. According to various other embodiments, the movement path of the second jaw 126 may include an arcuate profile, or a diagonal profile which may terminate towards the first jaw 122. According to various other embodiments, the second jaw 126 may be movable along a movement plane which intersects the lateral plane 123 at an angle, whereby the movement path of the second jaw 126 may include an arcuate profile, or a diagonal profile along the movement plane which may terminate towards the first jaw 122. According to various embodiments, the clamping action of the first jaw 122 and second jaw 126 may be for clamping the free-end 105 of the tape 104 around the perimeter of the lens-mold-assembly 120 which is aligned to the tape gripping mechanism 120. According to various embodiments, the tape gripping mechanism 120 may include an actuator for moving the second jaw 126.

According to various embodiments, the tape gripping mechanism 120 may include a proximity sensing arrangement 130 disposed on the first jaw 122. The proximity sensing arrangement 130 may be configured to generate a first detection signal when the free-end 105 of the tape 104 is detected at a pre-determined distance from the first jaw 122. Accordingly, when the lens-mold-assembly 102 that is aligned to the tape gripping mechanism 120 is being rotated by the lens-mold-assembly-rotation mechanism 110 with respect to the tape gripping mechanism 120, the free-end 105 of the tape 104 may be rotated towards the clamping surface 124 of the first jaw 122 of the tape gripping mechanism 120. The proximity sensing arrangement 130 may be configured to detect the free-end 105 of the tape 104 that is being rotated towards the clamping surface 124 of the first jaw 122 at a pre-determined distance from the clamping surface 124 of the first jaw 122 prior to the free-end 105 of the tape 104 making any physical contact with the clamping surface 124 of the first jaw 122. Accordingly, the proximity sensing arrangement 130 may detect the free-end 105 of the tape 104 as it is nearing the clamping surface 124 of the first jaw 122. According to various embodiments, a sensitivity of the proximity sensing arrangement 130 may be adjustable so as to adjust and set the pre-determined distance at which to detect the free-end 105 of the tape 104. According to various embodiments, the proximity sensing arrangement 130 may include, but not limited to, an optical sensor, a fiber optic sensor, an infrared sensor, a photoelectric sensor, a laser sensor, a capacitive sensor, or an ultrasonic sensor.

According to various embodiments, the lens-mold-assembly-rotation mechanism 110 may be configured to vary a rotational speed of the first rotary part 112 and the second rotary part 114 based on the first detection signal from the proximity sensing arrangement 130. Accordingly, the rotational speed of the first rotary part 112 and the second rotary part 114 of the lens-mold-assembly-rotation mechanism 110 may be controlled based on the first detection signal from the proximity sensing arrangement 130. Hence, in response to the first detection signal from the proximity sensing arrangement 130, the lens-mold-assembly-rotation mechanism 110 may be controlled to vary a rotational speed of the first rotary part 112 and the second rotary part 114. According to various embodiments, to vary the rotational speed of the first rotary part 112 and the second rotary part 114 may include reducing the rotational speed of the first rotary part 112 and the second rotary part 114. Accordingly, the lens-mold-assembly-rotation mechanism 110 may be configured or controlled to reduce the rotational speed of the first rotary part 112 and the second rotary part 114 based on the first detection signal from the proximity sensing arrangement 130. According to various embodiments, the reduction in the rotational speed of the first rotary part 112 and the second rotary part 114 may include an abrupt reduction, for example a discrete jump to a lower speed, or a gradual reduction, for example a progressive slowing down of speed. According to various embodiments, the lens-mold-assembly-rotation mechanism 110 may be configured or controlled to reduce the rotational speed of the first rotary part 112 and the second rotary part 114 by between 20% to 95%. Accordingly, after the reduction in rotational speed of the lens-mold-assembly-rotation mechanism 110, the first rotary part 112 and the second rotary part 114 may be rotating at a speed that is between 5% to 80% of the initial rotational speed.

According to various embodiments, the tape gripping mechanism 120 may include a contact sensing arrangement 140 disposed on the clamping surface 124 of the first jaw 122. The contact sensing arrangement 140 may be configured to generate a second detection signal when the free-end 105 of the tape 104 is in contact with the clamping surface 124 of the first jaw 122. Accordingly, with the lens-mold-assembly 102 that is aligned to the tape gripping mechanism 120 being rotated by the lens-mold-assembly-rotation mechanism 110 with respect to the tape gripping mechanism 120, the free-end 105 of the tape 104 that is rotated towards the clamping surface 124 of the first jaw 122 of the tape gripping mechanism 120 may eventually come into physical contact with the clamping surface 124 of the first jaw 122. The contact sensing arrangement 140 may be configured to detect the physical contact between the free-end 105 of the tape 104 and the clamping surface 124 of the first jaw 122. Accordingly, the contact sensing arrangement 140 may detect the free-end 105 of the tape 104 as it touches or contacts the clamping surface 124 of the first jaw 122. According to various embodiments, the contact sensing arrangement 140 may include, but not limited to, a vacuum sensing arrangement, a pressure sensing arrangement, or a force sensing arrangement.

According to various embodiments, the lens-mold-assembly-rotation mechanism 110 may be configured to stop the first rotary part 112 and the second rotary part 114 from rotating and the tape gripping mechanism 120 may be configured to move the second jaw 126 towards the first jaw 122 to perform the clamping action based on the second detection signal from the contact sensing arrangement 140. Accordingly, the rotation of the first rotary part 112 and the second rotary part 114 of the lens-mold-assembly-rotation mechanism 110 may be controlled to come to a stop or halt or to cease based on the second detection signal from the contact sensing arrangement 140. The second jaw 126 of the tape gripping mechanism 120 may also be controlled to move towards the first jaw 122 for clamping based on the second detection signal from the contact sensing arrangement 140. Hence, in response to the second detection signal from the contact sensing arrangement 140, the lens-mold-assembly-rotation mechanism 110 may be controlled to stop or halt or cease the rotation of the first rotary part 122 and the second rotary part 124. The tape gripping mechanism 120 may also be controlled to close the second jaw 126 towards the first jaw 122 for performing the clamping action. According to various embodiments, the lens-mold-assembly-rotation mechanism 110 and the tape gripping mechanism 120 may be controlled to simultaneously stop or halt or cease the rotation of the first rotary part 122 and the second rotary part 124 and close the second jaw 126 towards the first jaw 122 for clamping. According to various embodiments, the lens-mold-assembly-rotation mechanism 110 and the tape gripping mechanism 120 may be controlled to sequentially stop or halt or cease the rotation of the first rotary part 122 and the second rotary part 124 followed by moving the second jaw 126 towards the first jaw 122 for clamping.

According to various embodiments, with the de-taping machine 100 according to the various embodiments, the lens-mold-assembly 102 may be rotated by the lens-mold-assembly-rotation mechanism 110 at a high speed initially. Upon detection of the free-end 105 of the tape 104 of the lens-mold-assembly 102 by the proximity sensing arrangement 130 of the tape gripping mechanism 120 at the predetermined distance prior to the free-end 105 of the tape 104 contacting the first jaw 122 of the tape gripping mechanism 120, the lens-mold-assembly-rotation mechanism 110 may slow down the rotation of the lens-mold-assembly 102. With the rotation of the lens-mold-assembly 102 slowed down, the tape gripping mechanism 120 may then accurately grip the free-end 105 of the tape 104 of the lens-mold-assembly 102 via accurate detection of the free-end 105 of the tape 104 contacting the first jaw 122 of the tape gripping mechanism 120 via the contact sensing arrangement 140. Simultaneously, the rotation of the lens-mold-assembly 102 may be instantly stopped by the lens-mold-assembly-rotation mechanism 110 to facilitate gripping upon detection of contact between the free-end 105 of the tape 104 and the first jaw 122 of the tape gripping mechanism 120. Therefore, the de-taping machine 100 according to various embodiments may enable an efficient and high through-put automated process for tape removal from the lens-mold-assembly 102.

According to various embodiments, the proximity sensing arrangement 130 and the contact sensing arrangement 140 may be in a side-by-side arrangement at the clamping surface 124 of the first jaw 122 of the tape gripping mechanism 120. For example, the proximity sensing arrangement 130 and the contact sensing arrangement 140 may be in a side-by-side arrangement lengthwise along the clamping surface 124 of the first jaw 122. Accordingly, one of the proximity sensing arrangement 130 or the contact sensing arrangement 140 may be located towards an outer edge of the clamping surface 124 of the first jaw 122, while the other is located inwards of the clamping surface 124 of the first jaw 122. Hence, the proximity sensing arrangement 130 may be nearer to the outer edge of the clamping surface 124 of the first jaw 122 in the length direction or the contact sensing arrangement 140 may be nearer to the outer edge of the clamping surface 124 of the first jaw 122 in the length direction. As another example, the proximity sensing arrangement 130 and the contact sensing arrangement 140 may be in a side-by-side arrangement in a width direction of the clamping surface 124 of the first jaw 122. Accordingly, one of the proximity sensing arrangement 130 or the contact sensing arrangement 140 may be located towards an upper edge of the clamping surface 124 of the first jaw 122, while the other is located towards a lower edge of the clamping surface 124 of the first jaw 122. Hence, the proximity sensing arrangement 130 may be above the contact sensing arrangement 140 in the width direction of the clamping surface 124 of the first jaw 122 or the contact sensing arrangement 140 may be above the proximity sensing arrangement 130 in the width direction of the clamping surface 124 of the first jaw 122.

According to various embodiments, the first rotary part 112 and the second rotary part 114 of the lens-mold-assembly-rotation mechanism 110 may be linearly movable along the common axis 113. According to various embodiments, the first rotary part 112 and the second rotary part 114 may be linearly movable relative to each other along the common axis 113. According to various embodiments, the first rotary part 112 and the second rotary part 114 may be linearly movable towards or away from each other along the common axis 113. Accordingly, the first rotary part 112 and the second rotary part 114 may move in opposite directions towards or away from each other along the common axis 113. When the first rotary part 112 and the second rotary part 114 are move towards each other, the lens-mold-assembly-rotation mechanism 110 may sandwich or clamp or hold the lens-mold-assembly 102 between the first rotary part 112 and the second rotary part 114. When the first rotary part 112 and the second rotary part 114 are move towards each other, the lens-mold-assembly 102 may be removed from the lens-mold-assembly-rotation mechanism 110.

According to various embodiments, the first rotary part 112 and the second rotary part 114 of the lens-mold-assembly-rotation mechanism 110 may be further movable in a synchronous manner along the common axis 113 for moving the lens-mold-assembly 102 held therebetween to align with the tape gripping mechanism 120. Accordingly, in addition to moving in opposite directions relative to each other, the first rotary part 112 and the second rotary part 114 may be movable in a same direction simultaneously in a coordinated manner such that the lens-mold-assembly 102 sandwiched or clamped or held between the first rotary part 112 and the second rotary part 114 may be moved along the common axis 113 for aligning to the tape gripping mechanism 120. According to various embodiments, synchronously moving the first rotary part 112 and the second rotary part 114 along the common axis 113 may include upward movements as well as downward movements for fine tuning the alignment between the lens-mold-assembly 102 and the tape gripping mechanism 120.

According to various embodiments, each of the first rotary part 112 and the second rotary part 114 may include a pad or a cup or a contact surface or any suitable element for respectively engaging the first mold part 107 and the second mold part 109 of the lens-mold-assembly 102.

According to various embodiments, each of the first rotary part 112 and the second rotary part 114 may be coupled to a linear actuator for moving along the common axis 113. For example, each of the first rotary part 112 and the second rotary part 114 may be coupled to a plunger or a piston or an extension rod or any other suitable elements of the linear actuator.

According to various embodiments, the clamping surface 124 of the first jaw 122 of the tape gripping mechanism 120 may be flat. According to various embodiments, the second jaw 126 of the tape gripping mechanism 120 may include an opposing clamping surface 128. According to various embodiments, the clamping surface 124 of the first jaw 122 and the opposing clamping surface 128 of the second jaw 126 may be directed towards each other in a manner such that when the second jaw 126 is moved towards the first jaw 122 for clamping the free-end 105 of the tape 104, the clamping surface 124 of the first jaw 122 and the opposing clamping surface 128 of the second jaw 126 may be engaging opposite sides of the free-end 105 of the tape 104. According to various embodiments, the opposing clamping surface 128 of the second jaw 126 may include a rough surface or a jagged surface or a soft surface with high friction coefficient. According to various embodiments, the rough surface may include a sand paper surface or a coarse surface. According to various embodiments, the jagged surface may include teeth or ridges or pointed protrusions or gross knurling. According to various embodiments, the soft surface with high friction coefficient may include urethane layer or rubber layer. According to various embodiments, a friction coefficient between the tape 104 and the opposing clamping surface 128 of the second jaw 126 may be equal or more than 0.5 so as to minimise or eliminate the occurrence of the tape 104 slipping from between the first jaw 122 and the second jaw 126 when clamped therebetween.

FIG. 2A to FIG. 2E depict schematic diagrams of a method of removing the tape 104 around the perimeter of the lens-mold-assembly 102 according to various embodiments. FIG. 2A depicts the lens-mold-assembly 102 being rotated by the lens-mold-assembly-rotation mechanism 110 according to various embodiment. As shown the free-end 105 of the tape 104 may be sticking out along the perimeter of the lens-mold-assembly 102. With the lens-mold-assembly 102 centered and held by the first rotary part 112 and the second rotary part 114 of the lens-mold-assembly-rotation mechanism 110, controlling the first rotary part 112 and the second rotary part 114 to rotate about the common axis 113 may rotate the lens-mold-assembly 102 about the common axis 113 such that the free-end 105 of the tape 104 of the lens-mold-assembly 102 may be rotated towards the clamping surface 124 of the first jaw 122 of the tape gripping mechanism 120. Therefore, the method may include rotating the lens-mold-assembly 102 held between the coaxially aligned first and second rotary parts 112, 114 of the lens-mold-assembly-rotation mechanism 110, wherein the first and second rotary parts 112, 114 may be axially spaced from each other along the common axis 113 for holding the lens-mold-assembly 102 therebetween, and wherein the first and second rotary parts 112, 114 may be rotatable about the common axis 113 to rotate the lens-mold-assembly 102.

According to various embodiment, prior to rotating the lens-mold-assembly 102 by the lens-mold-assembly-rotation mechanism 110, the first rotary part 112 and the second rotary part 114 may be linearly moved towards each other along the common axis 113 to sandwich or clamp or hold the lens-mold-assembly 102. Further, the first rotary part 112 and the second rotary part 114 may then be moved linearly in a synchronous manner along the common axis 113 for aligning the lens-mold-assembly 102 with the tape gripping mechanism 120.

Figure 2B:
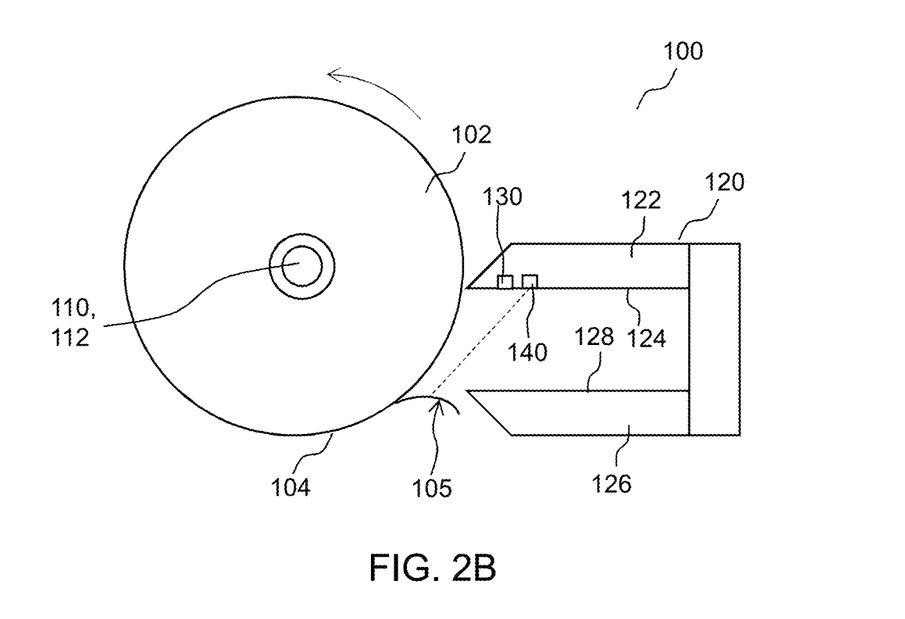
Figure 3:
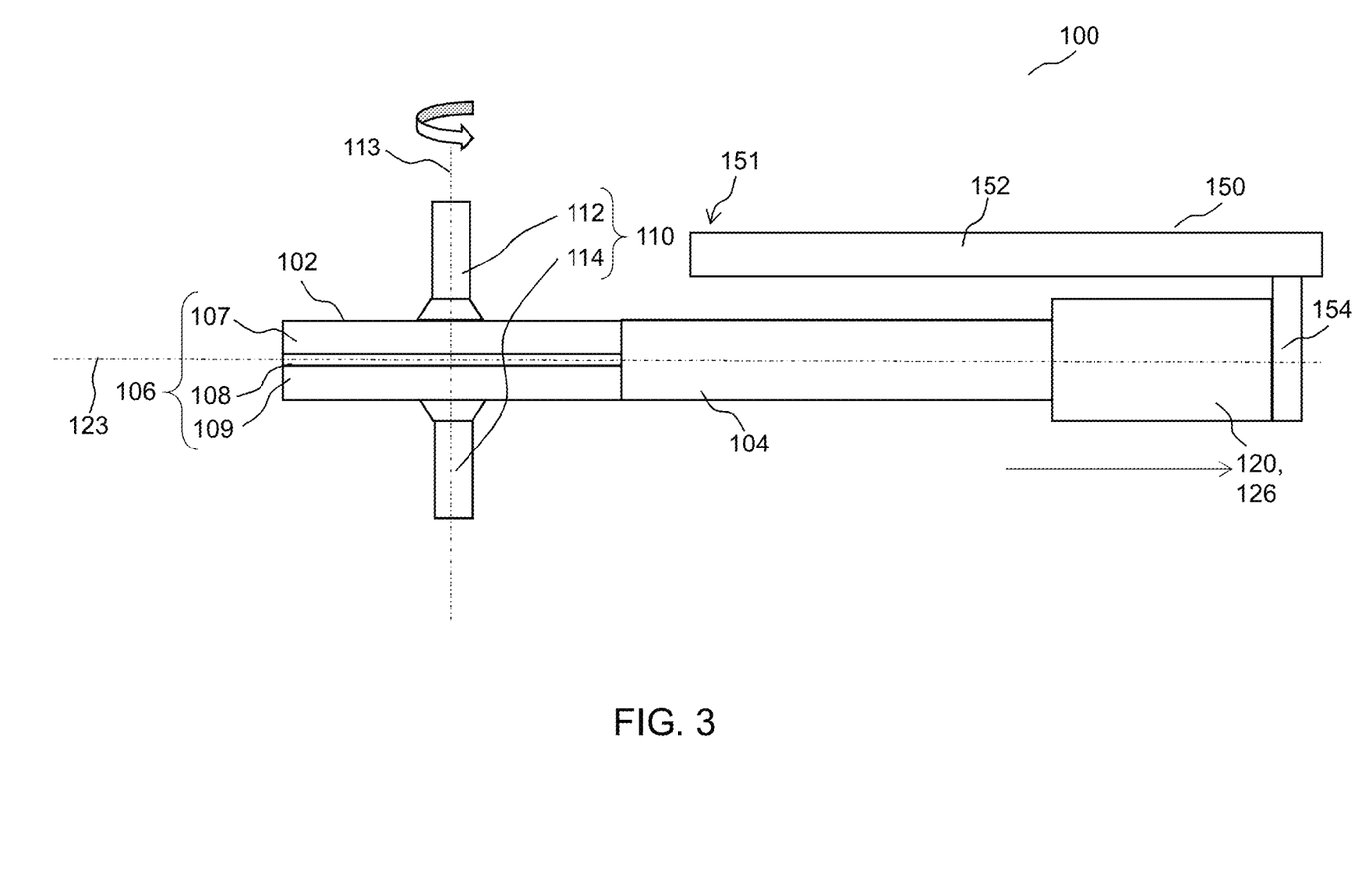
FIG. 3 depicts a schematic side view diagram of the de-taping machine of FIG. 1, which is illustrated with a tape gripping mechanism and tape peeling mechanism, according to various embodiments.

FIG. 2B depicts a detection of the free-end 105 of the tape 104 of the lens-mold-assembly 102 at the pre-determined distance from the clamping surface 124 of the first jaw 122 of the tape gripping mechanism 120 by the proximity sensing arrangement 130 at the clamping surface 124 of the first jaw 122 according to various embodiments. According to various embodiments, as the lens-mold-assembly 102 is being rotated by the lens-mold-assembly-rotation mechanism 110, the free-end 105 of the tape 104 of the lens-mold-assembly 102 may be rotated towards the clamping surface 124 of the first jaw 122 of the tape gripping mechanism 120. When the free-end 105 of the tape 104 of the lens-mold-assembly 102 reaches the pre-determined distance from the clamping surface 124 of the first jaw 122, the proximity sensing arrangement 130 at the clamping surface 124 of the first jaw 122 may detect the free-end 105 of the tape 104 and generate the first detection signal. Accordingly, the proximity sensing arrangement 130 may detect the presence of the free-end 105 of the tape 104 when the free-end 105 of the tape 104 of the lens-mold-assembly 102 reaches the pre-determined distance. Upon receiving the first detection signal from the proximity sensing arrangement 130, the lens-mold-assembly-rotation mechanism 110 may be controlled to vary the rotational speed of the first and second rotary parts 112, 114. According to various embodiments, lens-mold-assembly-rotation mechanism 110 may be controlled to reduce the rotational speed of the first and second rotary parts 112, 114 based on the first detection signal from the proximity sensing arrangement 130. Accordingly, the rotation of the lens-mold-assembly-rotation mechanism 110 may slow down to adopt a slow rotation speed, for example the rotational speed may slow down from between 1 to 120 rounds per minute to between 0.5 to 30 rounds per minute, upon detection of the free-end 105 of the tape 104 at the pre-determined distance by the proximity sensing arrangement 130. Therefore, the method may include varying the rotational speed of the first and second rotary parts 112, 114 based on the first detection signal from the proximity sensing arrangement 130, wherein the proximity sensing arrangement 130 may be disposed on the first jaw 122 of the tape gripping mechanism 120, wherein the lens-mold-assembly 102 may be aligned to the tape gripping mechanism 130, wherein the first jaw 122 of the tape gripping mechanism 120 may be disposed at the radial position from the common axis 113, wherein the proximity sensing arrangement 130 may be configured to generate the first detection signal when the free-end 105 of the tape 104 around the perimeter of the lens-mold-assembly 102 is detected at the pre-determined distance from the first jaw 122.

Figure 2C:
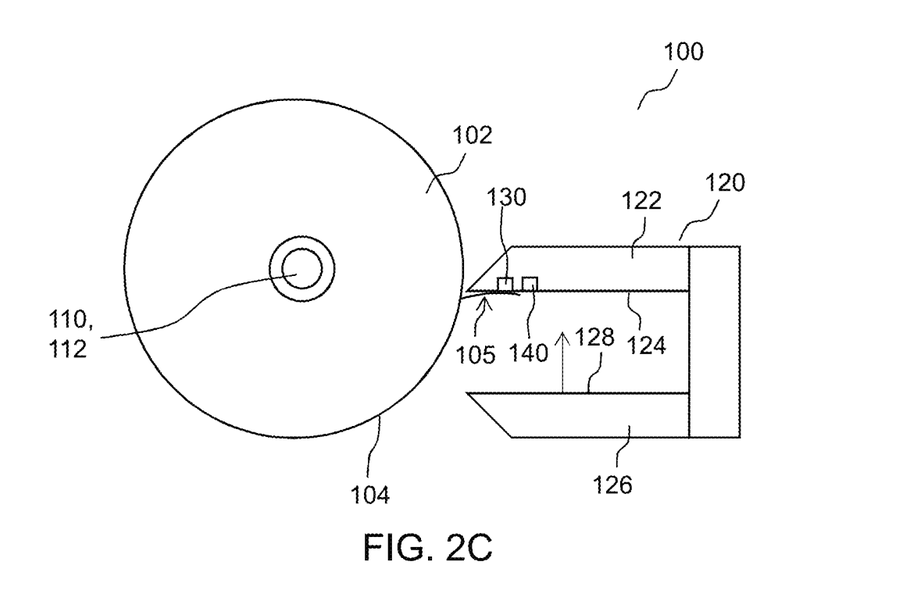

FIG. 2C depicts a detection of the free-end 105 of the tape 104 of the lens-mold-assembly 102 in contact with the clamping surface 124 of the first jaw 122 of the tape gripping mechanism 120 by the contact sensing arrangement 140 at the clamping surface 124 of the first jaw 122 according to various embodiments. According to various embodiments, as the lens-mold-assembly 102 continues to be rotated by the lens-mold-assembly-rotation mechanism 110, the free-end 105 of the tape 104 of the lens-mold-assembly 102 may eventually come into contact with the clamping surface 124 of the first jaw 122 of the tape gripping mechanism 120. When the free-end 105 of the tape 104 of the lens-mold-assembly 102 touches or contacts the clamping surface 124 of the first jaw 122, the contact sensing arrangement 140 at the clamping surface 124 of the first jaw 122 may detect the free-end 105 of the tape 104 and generate the second detection signal. Accordingly, the contact sensing arrangement 140 may detect the presence of the free-end 105 of the tape 104 in contact with the clamping surface 124 of the first jaw 122. Upon receiving the second detection signal from the contact sensing arrangement 140, the lens-mold-assembly-rotation mechanism 110 may be controlled to stop rotating the first and second rotary parts 112, 114. Further, the tape gripping mechanism 120 may be controlled to move the second jaw 126 towards the first jaw 122 for clamping the free-end 105 of the tape 104 in contact with the clamping surface 124 of the first jaw 122. Accordingly, the first and second rotary parts 112, 114 of the lens-mold-assembly-rotation mechanism 110 may be rotating at the reduced rotation speed after detection of the free-end 105 of the tape 104 at the pre-determined distance by the proximity sensing arrangement 130 until the contact sensing arrangement 140 detects the free-end 105 of the tape 104 in contact with the clamping surface 124 of the first jaw 122. When the contact sensing arrangement 140 detects the free-end 105 of the tape 104 in contact with the clamping surface 124 of the first jaw 122, the lens-mold-assembly-rotation mechanism 110 stops rotating. Further, the second jaw 126 may move towards the first jaw 122 for clamping the free-end 105 of the tape 104. Therefore, the method may include stopping the first and second rotary parts 112, 114 from rotating the lens-mold-assembly 102 and move the second jaw 126 of the tape gripping mechanism 120 towards the first jaw 122 to perform the clamping action for clamping the free-end 105 of the tape 104 based on the second detection signal from the contact sensing arrangement 140, wherein the second jaw 126 may be movable relative to the first jaw 122 to perform the clamping action, wherein the contact sensing arrangement 140 may be disposed on the clamping surface 124 of the first jaw 122 and configured to generate the second detection signal when the free-end 105 of the tape 104 is in contact with the clamping surface 124 of the first jaw 122.

Figure 4:
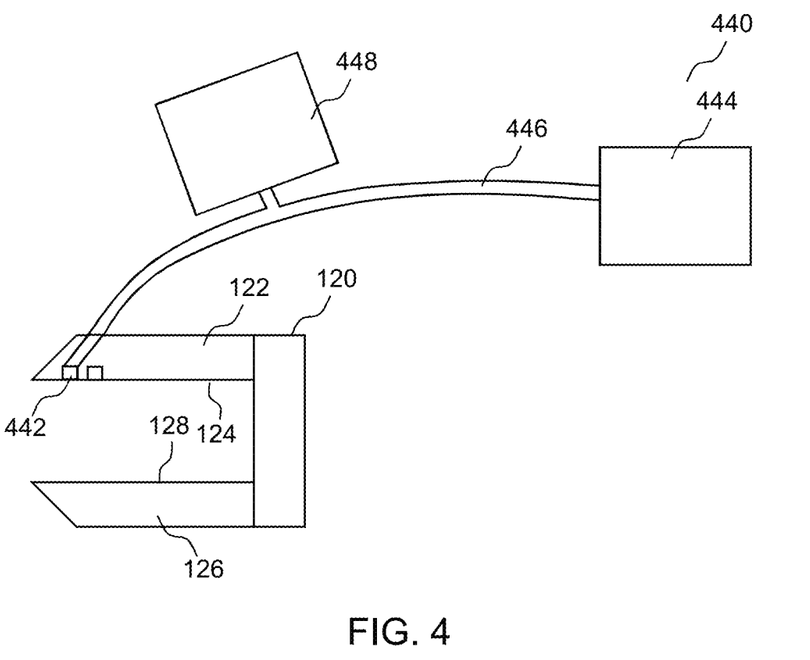
FIG. 4 depicts a vacuum detection arrangement at a first jaw of a tape gripping mechanism of a de-taping machine according to various embodiments.

According to various embodiments, when the contact sensing arrangement 140 is a vacuum detection arrangement 440 for example as shown in FIG. 4, contact between the free-end 105 of the tape 104 and the clamping surface 124 of the first jaw 122 may be detected when the free-end 105 of the tape 104 blocks a vacuum suction hole 442 at the clamping surface 124 of the first jaw 122 causing a change in pressure in the vacuum suction hole 442. Upon detecting the free-end 105 of the tape 104 in contact with the clamping surface 124 of the first jaw 122, vacuum suction may continue to suck the free-end 105 of the tape 104 so as to keep a flat contact between the free-end 105 of the tape 104 and the clamping surface 124 of the first jaw 122. In this manner, when the second jaw 126 moves to close towards the first jaw 122, a strong grasping or clamping of the free-end 105 of the tape 104 may be achieved. Subsequently, the vacuum suction may continue to be applied, even when the free-end 105 of the tape 104 is clamped between the first jaw 122 and the second jaw 126, to reinforce the grasping or clamping of the free-end 105 of the tape 104.

Figure 2D:
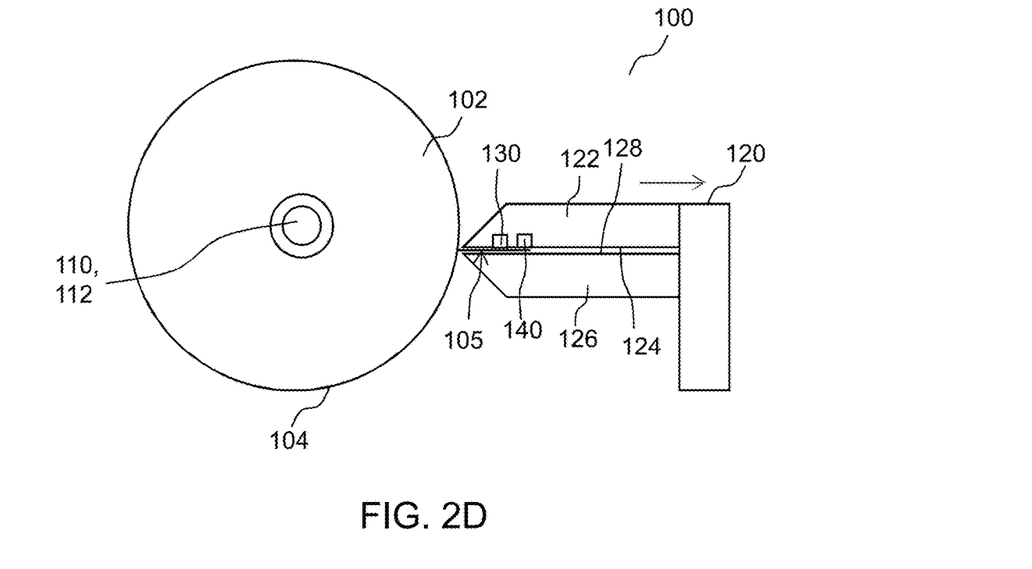

FIG. 2D depicts the free-end 105 of the tape 104 of the lens-mold-assembly 102 being clamped between the first jaw 122 and the second jaw 126 of the tape gripping mechanism 120 according to various embodiments. According to various embodiments, after the second jaw 126 of the tape gripping mechanism 120 is closed towards the first jaw 122, the free-end 105 of the tape 104 of the lens-mold-assembly 102 may be clamped between the first jaw 122 and the second jaw 126 as shown in FIG. 2D. With the free-end 105 of the tape 104 of the lens-mold-assembly 102 clamped between the first jaw 122 and the second jaw 126, the tape gripping mechanism 120 may be moved away, via the tape peeling mechanism 150 (see FIG. 4), from the common axis 130 with the free-end 105 of the tape 104 of the lens-mold-assembly 102 remained clamped in a manner so as to peel or unroll the tape 104 from the lens-mold-assembly 102.

Figure 2E:
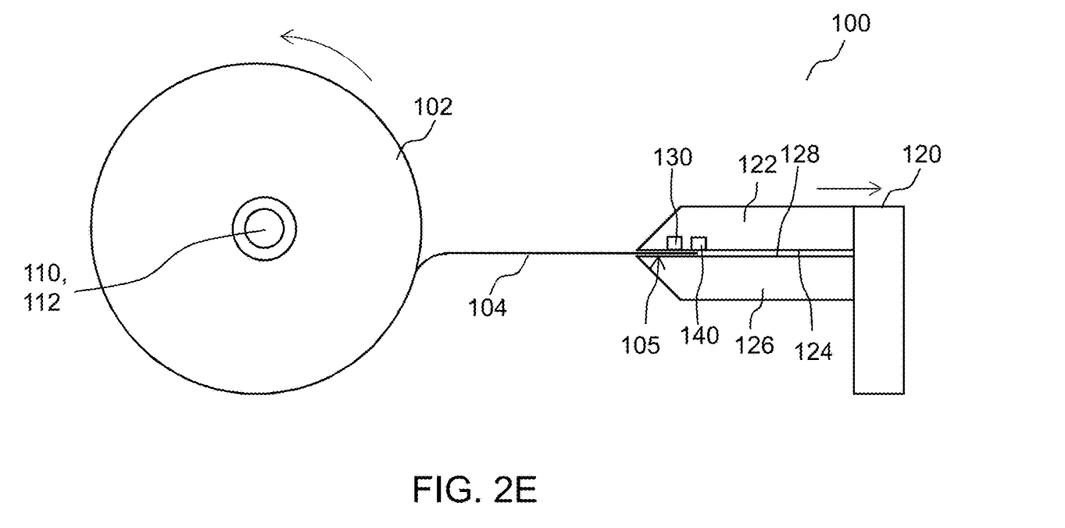

FIG. 2E depicts the tape gripping mechanism 120 moved away from the lens-mold-assembly 102 to peel or unroll the tape 104 from the lens-mold-assembly 102. According to various embodiments, as the tape gripping mechanism 120 is being moved away from the lens-mold-assembly 102, via the tape peeling mechanism 150, with the free-end 105 of the tape 104 of the lens-mold-assembly 102 clamped by the tape gripping mechanism 120, the lens-mold-assembly 102 may be rotated as the tape 104 is being peeled or unrolled from the perimeter of the lens-mold-assembly 102. According to various embodiments, the tape peeling mechanism 150 may be configured to move the tape gripping mechanism 120 along a translation axis directed away from the common axis 130. According to various embodiments, the first rotary part 112 and the second rotary part 114 of the lens-mold-assembly-rotation mechanism 110 may be configured to rotate freely during peeling or unrolling of the tape 104, or to be rotated to follow the peeling or unrolling of the tape 104 under actuation or a driving force.

According to various embodiments, the method as illustrated by FIG. 2A to FIG. 2E may enable a high accuracy of tape tail detection as well as a reliable and repeatable tape grasping and removal process to allow a sustained continuous operation of tape removal with a high productivity output.

FIG. 3 depicts a schematic side view diagram of the de-taping machine 100 of FIG. 1, which is illustrated with the tape gripping mechanism 120 and tape peeling mechanism 150, according to various embodiments. In FIG. 3, the de-taping machine 100 is illustrated with the tape 104 being peeled or unrolled from the lens-mold-assembly 102. As shown in FIG. 3, the tape gripping mechanism 120 may be mounted to the tape peeling mechanism 150. According to various embodiments, the tape peeling mechanism 150 may include a track 152 fixedly positioned with respect to the common axis 113. Accordingly, the track 152 of the tape peeling mechanism 150 may be disposed in a stationary pre-determined position from the common axis 113 in a manner such that it is immovable with respect to the common axis 113. According to various embodiments, the track 152 may include a strip or a rail or a bar or a pole forming a guide to which the tape gripping mechanism 120 may be mounted and moved. According to various embodiments, when the tape gripping mechanism 120 is at a first end 151 of the track 152, the first jaw 122 of the tape gripping mechanism 120 may be positioned at a predetermined distance in a radial direction (or radiating) from the common axis 113. According to various embodiments, the track 152 may be parallel to the lateral plane 123. Accordingly, the tape peeling mechanism 150 may move the tape gripping mechanism 120 along the lateral plane 123. According to various embodiments, the track 152 may be straight. Accordingly, the tape peeling mechanism 150 may move the tape gripping mechanism 120 in a straight path along the lateral plane 123 in a direction away from the lens-mold-assembly 102. According to various embodiments, the track 152 may be extending in a radial direction away from the common axis 113 in a manner so as to be extending radially away from the lens-mold-assembly 102. According to various other embodiments, the track 152 may be extending in a tangential direction with respect to the perimeter of the lens-mold-assembly 102.

According to various embodiments, the tape peeling mechanism 150 may include a slider 154 in sliding engagement with the track 152. According to various embodiments, the slider 154 may include a slidable component which may be loosely attached or engaged to the track 152 in a manner so as to be translatable along the track 152 via sliding. According to various embodiments, the translation axis or the movement axis of the slider 154 may extend along the track 152. According to various embodiments, the tape gripping mechanism 120 may be mounted to the slider 154. Accordingly, the tape gripping mechanism 120 may be mounted to the track 152 of the tape peeling mechanism 150 via the slider 154. Hence, the tape gripping mechanism 120 may be movable relative to the track 152 via the slider 154. According to various embodiments, a sliding stroke of the slider 154 may cover a translation distance equal or more than a length of the tape 104 of the lens-mold-assembly along the track 152. According to various embodiments, the tape peeling mechanism 150 may be configured such that the sliding stroke of the slider 154 may be settable or customisable (e.g. between 0 to 500 mm). For example, the tape peeling mechanism 150 may include a mechanical stopper or a limiter which may be fixed or set at various positions along the track 152 for forming as a physical barrier to the translation or movement of the slider 154. As another example, the tape peeling mechanism 150 may include a sensor for measuring and determining a distance travelled or translated by the slider 154 so as to control the sliding stroke of the slider 154. As yet another example, the tape peeling mechanism 150 may include a sensor which may be fixed or set at various positions along the track 152 for determining whether the slider 154 has reached or passed said position along the track 152 for controlling the slider 154 to stop its movement or translation. According to various embodiments, the slider 154 may be driven to slide along the track 152. Accordingly, an actuator or a driver may be connected to the slider 154 for driving the slider 154. According to various embodiments, the actuator or the driver may include electrical actuator or pneumatic actuator. According to various embodiments, a speed of translation or sliding of the slider 154 may be settable or customisable (e.g. between 0 to 4 m/s).

FIG. 4 shows the vacuum detection arrangement 440 at the first jaw 122 of the tape gripping mechanism 120 according to various embodiments. According to various embodiments, the vacuum detection arrangement 440 may be one of the contact sensing arrangement 140 for the first jaw 122 of the tape gripping mechanism 120. According to various embodiments, the vacuum detection arrangement 440 may include the vacuum suction hole 442 at the clamping surface 124 of the first jaw 122 of the tape gripping mechanism 120. In an example, the vacuum suction hole 442 may have a diameter between 1 to 10 mm According to various embodiments, the vacuum suction hole 442 may be connected to a vacuum generating component 444. The vacuum generating component 444 may include a vacuum ejector or a vacuum pump. In an example, the vacuum generating component 44 may generate a vacuum flow between 0.005 to 1 m$^3$/min According to various embodiments, the vacuum detection arrangement 440 may include a vacuum conduit 446 may connect the vacuum suction hole 442 and the vacuum generating component 444. The vacuum conduit 446 may include a vacuum tubing arrangement or a vacuum piping arrangement. According to various embodiments, the vacuum detection arrangement 440 may include a pressure sensor 448 connected to between the vacuum suction hole 442 and the vacuum generating component 444 along the vacuum conduit 446. The pressure sensor 448 may include a digital pressure switch or a digital pressure sensor. Accordingly, the pressure sensor 448 may measure a suction pressure of the vacuum suction hole 442.

According to various embodiments, when the vacuum generating component 444 is activated or operated, vacuum suction may be generated at the vacuum suction hole 442. At the same time, the pressure sensor 448 may measure and monitor the suction pressure at the vacuum suction hole 442. According to various embodiments, when the free-end 105 of the tape 104 contacts the clamping surface 124 of the first jaw 122 of the tape gripping mechanism 120, the free-end 105 of the tape 104 may block the vacuum suction hole 442. When the vacuum suction hole 442 is blocked, the suction pressure at the vacuum suction hole 442 may change and the pressure sensor 448 may detect the change in the suction pressure. Accordingly, the pressure sensor 448 may generate a corresponding detection signal indicating that the free-end 105 of the tape 104 is in contact with the clamping surface 124 of the first jaw 122 and is blocking the vacuum suction hole 442. According to various embodiments, the corresponding detection signal from the pressure sensor 448 may form the second detection signal of the contact sensing arrangement 120. Accordingly, the lens-mold-assembly-rotation mechanism 110 may be controlled to stop the first rotary part 112 and the second rotary part 114 from rotating and the tape gripping mechanism 120 may be controlled to move the second jaw 126 towards the first jaw 122 for clamping the free-end 105 of the tape 104 based on the corresponding detection signal from the pressure sensor 448. According to various embodiments, when the free-end 105 of the tape 104 is clamped between the first jaw 122 and the second jaw 126 of the tape gripping mechanism 120, the vacuum suction at the vacuum suction hole 442 may be maintained so as to help to retain the free-end 105 of the tape 104 between the first jaw 122 and the second jaw 126 during peeling or unrolling of the tape 104.

According to various embodiments, the machine 100 may include a processor. In various embodiments, a "processor" may be understood as any kind of a logic implementing entity, which may be special purpose circuitry or a processor executing software stored in a memory, firmware, or any combination thereof. Thus, in an embodiment, a "processor" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "processor" may also be a processor executing software, e.g. any kind of computer program, e.g. a computer program using a virtual machine code such as e.g. Java. Any other kind of implementation of the respective functions which will be described in more detail below may also be understood as a "processor" in accordance with various embodiments. In various embodiments, the processor may be part of a computing system or a controller or a microcontroller or any other system providing a processing capability. According to various embodiments, such systems may include a memory which is for example used in the processing carried out by the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

According to various embodiments, the processor may be configured to generate various control signals for operating the various components of the machine 100. According to various embodiments, the processor may be configured to generate the various control signals so as to operate the machine 100 in accordance to the various methods as described herein. According to various embodiments, the processor may be configured to generate the various control signals in a pre-determined sequence based on the various methods as described herein. According to various embodiments, the processor may receive the various detection signals from the various sensor arrangement (such as the proximity sensor arrangement 130 and the contact sensor arrangement 140), process the various detection signals, and generate corresponding control signals in response to the various detection signals for controlling various components of the machine 100. For example, the processor may be configured to control the lens-mold-assembly-rotation mechanism 110 to rotate the lens-mold-assembly 102; detect, via the proximity sensor arrangement 130, the free-end 105 of the tape 104 as it is being rotated towards the tape gripping mechanism 120; control the lens-mold-assembly-rotation mechanism 110 to slow down the rotation of the lens-mold-assembly 102 based on the detection of the free-end 105 of the tape 104 by the proximity sensor arrangement 130; detect, via the contact sensor arrangement 140, the free-end 105 of the tape 104 in contact with the first jaw 122 of the tape gripping mechanism 120; control the lens-mold-assembly-rotation mechanism 110 to stop rotating the lens-mold-assembly 102 and control the tape gripping mechanism 120 to clamp the free-end 105 of the tape 104; and subsequently control the tape peeling mechanism 150 to move the tape gripping mechanism 120 away from the lens-mold-assembly 102 to peel or unroll the tape 104.

Various embodiments have provided a de-taping machine and a method for removing the tape of the lens-mold-assembly in an effective and repeatable manner Various embodiments may be capable of rotating the lens-mold-assembly at a high speed, detect the free-end of the tape when it is approaching the tape gripping mechanism, slow down the rotation, and accurately grip the free-end of the tape with the tape gripping mechanism. Accordingly, various embodiment may provide an efficient and high through-put process for tape removal from the lens-mold-assembly.

Although representative processes and articles have been described in detail herein, those skilled in the art will recognize that various substitutions and modifications may be made without departing from the scope of what is described and defined by the appended claims.

What is claimed is:

1. A de-taping machine for removing a tape around a perimeter of a lens-mold-assembly, the machine comprising:
   a lens-mold-assembly-rotation mechanism having a first rotary part and a second rotary part coaxially aligned, the first rotary part and the second rotary part being operable to be axially spaced from each other along a common axis for holding the lens-mold-assembly therebetween, each of the first rotary part and the second rotary part being rotatable about the common axis; and
   a tape gripping mechanism comprising
   a first jaw disposed at a radial position from the common axis, the first jaw having a clamping surface,
   a second jaw movable towards the first jaw to perform a clamping action for clamping a free end of the tape around the perimeter of the lens-mold-assembly aligned to the tape gripping mechanism,
   a proximity sensing arrangement disposed on the first jaw and configured to generate a first detection signal when the free end of the tape is detected at a pre-determined distance from the first jaw, and
   a contact sensing arrangement disposed on the clamping surface of the first jaw and configured to generate a second detection signal when the free end of the tape is in contact with the clamping surface of the first jaw,
   wherein the lens-mold-assembly-rotation mechanism is configured to vary a rotational speed of the first rotary part and the second rotary part based on the first detection signal from the proximity sensing arrangement,
   wherein the lens-mold-assembly-rotation mechanism is configured to stop the first rotary part and the second rotary part from rotating and the tape gripping mechanism is configured to move the second jaw towards the first jaw to perform the clamping action based on the second detection signal from the contact sensing arrangement.

2. The machine as claimed in claim 1, wherein the lens-mold-assembly-rotation mechanism is configured to reduce the rotational speed of the first rotary part and the second rotary part based on the first detection signal from the proximity sensing arrangement.

3. The machine as claimed in claim 2, wherein the lens-mold-assembly-rotation mechanism is configured to reduce the rotational speed of the first rotary part by between 20% to 95% and to reduce the rotational speed of the second rotary part by between 20% to 95%.

4. The machine as claimed in claim 1, wherein each of the first rotary part and the second rotary part is linearly movable along the common axis.

5. The machine as claimed in claim 1, wherein the proximity sensing arrangement comprises a fiber optic sensor.

6. The machine as claimed in claim 1, wherein the contact sensing arrangement comprises a vacuum hole in the clamping surface of the first jaw, a vacuum ejector coupled to the vacuum hole and a pressure sensor connected between the vacuum hole and the vacuum ejector.

7. The machine as claimed in claim 1, further comprising a tape peeling mechanism to which the tape gripping mechanism is mounted, wherein the tape peeling mechanism comprises
   a track fixedly positioned with respect to the common axis; and
   a slider in sliding engagement with the track,
   wherein the tape gripping mechanism is mounted to the slider.

8. The machine as claimed in claim 7, wherein the tape peeling mechanism is operable to slide the tape gripping mechanism away or towards the common axis.

9. The machine as claimed in claim 1, wherein the clamping surface of the first jaw is flat.

10. The machine as claimed in claim 9, wherein an opposing clamping surface of the second jaw comprises a rough surface or a jagged surface or a soft surface with high friction coefficient.

11. A method of removing a tape around a perimeter of a lens-mold-assembly, the method comprising:
   rotating the lens-mold-assembly held between coaxially aligned first and second rotary parts of a lens-mold-assembly-rotation mechanism of a de-taping machine, wherein the first and second rotary parts are axially spaced from each other along a common axis for holding the lens-mold-assembly therebetween, and wherein the first and second rotary parts are rotatable about the common axis to rotate the lens-mold-assembly;
   varying a rotational speed of the first and second rotary parts based on a first detection signal from the proximity sensing arrangement, wherein the proximity sensing arrangement is disposed on a first jaw of a tape gripping mechanism of the de-taping machine, wherein the lens-mold-assembly is aligned to the tape gripping mechanism, wherein the first jaw of the tape gripping mechanism is disposed at a radial position from the common axis, wherein the proximity sensing arrangement is configured to generate the first detection signal when a free end of the tape around the perimeter of the lens-mold-assembly is detected at a pre-determined distance from the first jaw; and
   stopping the first and second rotary parts from rotating the lens-mold-assembly and move a second jaw of the tape gripping mechanism of the de-taping machine towards the first jaw to perform a clamping action for clamping the free end of the tape based on a second detection signal from a contact sensing arrangement, wherein the second jaw is movable relative to the first jaw to perform the clamping action, wherein the contact sensing arrangement is disposed on a clamping surface of the first jaw and configured to generate the second detection signal when the free end of the tape is in contact with the clamping surface of the first jaw.

12. The method as claimed in claim 11, wherein varying the rotational speed of the first and second rotary parts comprises reducing the rotational speed of the first and second rotary parts.

13. The method as claimed in claim 11, further comprising sliding the tape gripping mechanism away from the common axis via a tape peeling mechanism to peel the tape from the lens-mold-assembly, wherein the tape peeling mechanism comprises a track fixedly positioned with respect to the common axis and a slider in sliding engagement with the track, wherein the tape gripping mechanism is mounted to the slider.

14. The method as claimed in claim 11, further comprising moving the first and second rotary parts of the lens-mold-assembly-rotation mechanism linearly towards each other along the common axis to hold the lens-mold-assembly therebetween.

15. The method as claimed in claim 14, further comprising moving the first and second rotary parts of the lens-mold-assembly-rotation mechanism with the lens-mold-assembly held therebetween linearly along the common axis in a synchronous manner to align the lens-mold-assembly to the tape gripping mechanism of the de-taping machine.

16. The machine as claimed in claim 2, wherein each of the first rotary part and the second rotary part is linearly movable along the common axis.

17. The machine as claimed in claim 3, wherein each of the first rotary part and the second rotary part is linearly movable along the common axis.

18. The machine as claimed in claim 2, wherein the proximity sensing arrangement comprises a fiber optic sensor.

19. The machine as claimed in claim 3, wherein the proximity sensing arrangement comprises a fiber optic sensor.

20. The machine as claimed in claim 2, wherein the contact sensing arrangement comprises a vacuum hole in the clamping surface of the first jaw, a vacuum ejector coupled to the vacuum hole and a pressure sensor connected between the vacuum hole and the vacuum ejector.

* * * * *